United States Patent
Nakayama (10) Patent No.: US 10,459,645 B2
(45) Date of Patent: Oct. 29, 2019

(54) INFORMATION PROCESSING APPARATUS AND METHOD OF CONTROLLING INFORMATION PROCESSING APPARATUS

(71) Applicant: FUJITSU LIMITED, Kawasaki-shi, Kanagawa (JP)

(72) Inventor: Tsutomu Nakayama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 120 days.

(21) Appl. No.: 15/455,933

(22) Filed: Mar. 10, 2017

(65) Prior Publication Data

US 2017/0277468 A1 Sep. 28, 2017

(30) Foreign Application Priority Data

Mar. 28, 2016 (JP) .................... 2016-063850

(51) Int. Cl.
*G06F 3/06* (2006.01)
(52) U.S. Cl.
CPC .......... *G06F 3/0632* (2013.01); *G06F 3/0604* (2013.01); *G06F 3/0683* (2013.01)
(58) Field of Classification Search
CPC ..... G06F 3/0632; G06F 3/0604; G06F 3/0683
See application file for complete search history.

(56) References Cited

U.S. PATENT DOCUMENTS

| 6,374,353 B1 * | 4/2002 | Settsu | G06F 9/4406 713/2 |
|---|---|---|---|
| 6,785,806 B1 * | 8/2004 | Schaefer | G06F 9/4403 711/103 |
| 7,065,688 B1 * | 6/2006 | Moyes | G06F 11/106 700/2 |
| 2004/0158701 A1 * | 8/2004 | Merkin | G06F 9/4403 713/2 |
| 2005/0216721 A1 * | 9/2005 | Zimmer | G06F 9/4401 713/2 |
| 2009/0187717 A1 * | 7/2009 | Nasu | G06F 12/0802 711/141 |
| 2009/0287900 A1 * | 11/2009 | Kirscht | G06F 9/4406 711/173 |

(Continued)

FOREIGN PATENT DOCUMENTS

| JP | 2009-277223 | 11/2009 |
|---|---|---|
| WO | 2010/058440 | 5/2010 |

*Primary Examiner* — Ryan Bertram
(74) *Attorney, Agent, or Firm* — Fujitsu Patent Center (57) ABSTRACT

It is provided a non-transitory computer-readable recording medium storing a program that causes an information processing apparatus which includes a plurality of memory areas and executes a first process and a process for rebooting the information processing apparatus and a second process. The information processing apparatus executes initializing a memory area of the plurality of memory areas as a memory area used for executing the first process, storing first information in a memory area, the first information indicating whether each memory area of the plurality of memory areas is initialized, executing the first process by using the memory area initialized as the memory area used for executing the first process, and initializing according to the first information, during the process for rebooting the information processing apparatus, a memory area which is not initialized as a memory area used for executing the second process.

6 Claims, 10 Drawing Sheets

(56) References Cited

U.S. PATENT DOCUMENTS

| | | | |
|---|---|---|---|
| 2011/0161646 A1* | 6/2011 | Yu | G06F 9/4401 713/2 |
| 2011/0213955 A1* | 9/2011 | Takai | G06F 9/4401 713/2 |
| 2011/0246744 A1 | 10/2011 | Kirscht et al. | |

* cited by examiner

| FLAG | SETUP_MODE |
|---|---|
| VALUE | 1 |

*FIG. 5*

| BIT | 1 | 2 | 3 | 4 | 5 | ... | 194 | 195 | 196 |
|---|---|---|---|---|---|---|---|---|---|
| VALUE | 1 | 1 | 0 | 0 | 0 | ... | 0 | 0 | 0 |

FIG. 8

| FLAG | OS_INSTALLED |
|---|---|
| VALUE | 1 |

FIG. 10

//www.w3.org/1999/xhtml">

INFORMATION PROCESSING APPARATUS AND METHOD OF CONTROLLING INFORMATION PROCESSING APPARATUS

CROSS-REFERENCE TO RELATED APPLICATION

This application is based upon and claims the benefit of priority of the prior Japanese Patent Application No. 2016-063850, filed on Mar. 28, 2016, the entire contents of which are incorporated herein by reference.

FIELD

The embodiments discussed herein are related to a non-transitory computer-readable recording medium storing a program, an information processing apparatus and a method of controlling an information processing apparatus.

BACKGROUND

In an information processing apparatus such as a server equipped with many Central Processing Units (CPUs) and memory, processes are executed for setting and tuning of transmission parameters for the memory interface and initializing the memory etc. The processes are executed in order to accelerate the signal transmission between the CPUs and memory in the server and to ensure the signal quality transmitted between the CPUs and memory.

In addition, the processes are executed by the Basic Input/Output System Firmware (BIOS FW) in the server. The BIOS is a type of firmware for the server. And the BIOS is one of the programs for the lowest level of input/output with the hardware in the server. When many CPUs and memory are equipped with the server, the BIOS may take a long time to initialize the memory and a problem that the time required for starting the server becomes longer than the time for starting a server equipped with less CPUs and memory will arise.

Techniques are proposed for reducing the time for starting a server. For example, one of the proposed techniques is to initialize memory which is not used for starting a server in which the OS is installed in parallel with processes for starting the OS (See patent document 1). In addition, one of the proposed techniques is to reduce the time for initializing the memory by using CPUs or CPU cores to initialize different pieces of memory in the server (See patent document 2).

The following patent document describes conventional techniques related to the techniques described herein.

[Patent Document]

[Patent document 1] Japanese National Publication of International Patent Application No. 2009-277223

[Patent document 2] International Publication Pamphlet No. 2010/058440

SUMMARY

According to one embodiment, it is provided a non-transitory computer-readable recording medium storing a program that causes an information processing apparatus which includes a plurality of memory areas and executes a first process and a process for rebooting the information processing apparatus and a second process to execute initializing a memory area of the plurality of memory areas as a memory area used for executing the first process, storing first information in a memory area, the first information indicating whether each memory area of the plurality of memory areas is initialized, executing the first process by using the memory area initialized as the memory area used for executing the first process, and initializing according to the first information, during the process for rebooting the information processing apparatus, a memory area which is not initialized as a memory area used for executing the second process.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

When an OS is installed in a server as an example of an information processing apparatus, the server may be rebooted during the installation processes. In addition, the server may also be rebooted when processes for changing system parameters of the server such as changing of the hardware configurations including the Input/Output of the server and changing of the registry and configuration files and processes for starting the OS are performed sequentially. Therefore, when the server is rebooted, the memory which has been used before the reboot is reinitialized. As a result, the time for rebooting the server may prolong the time for processing the installation. However, even when the conventional techniques as described above are adopted, is would be still difficult to reduce the time for executing processes such as the initialization of the memory upon the reboot of the server. Embodiments are described below with reference to the drawings. Configurations of the following embodiment are exemplifications, and the present apparatus is not limited to the configurations of the embodiment.

First Embodiment

Figure 1:
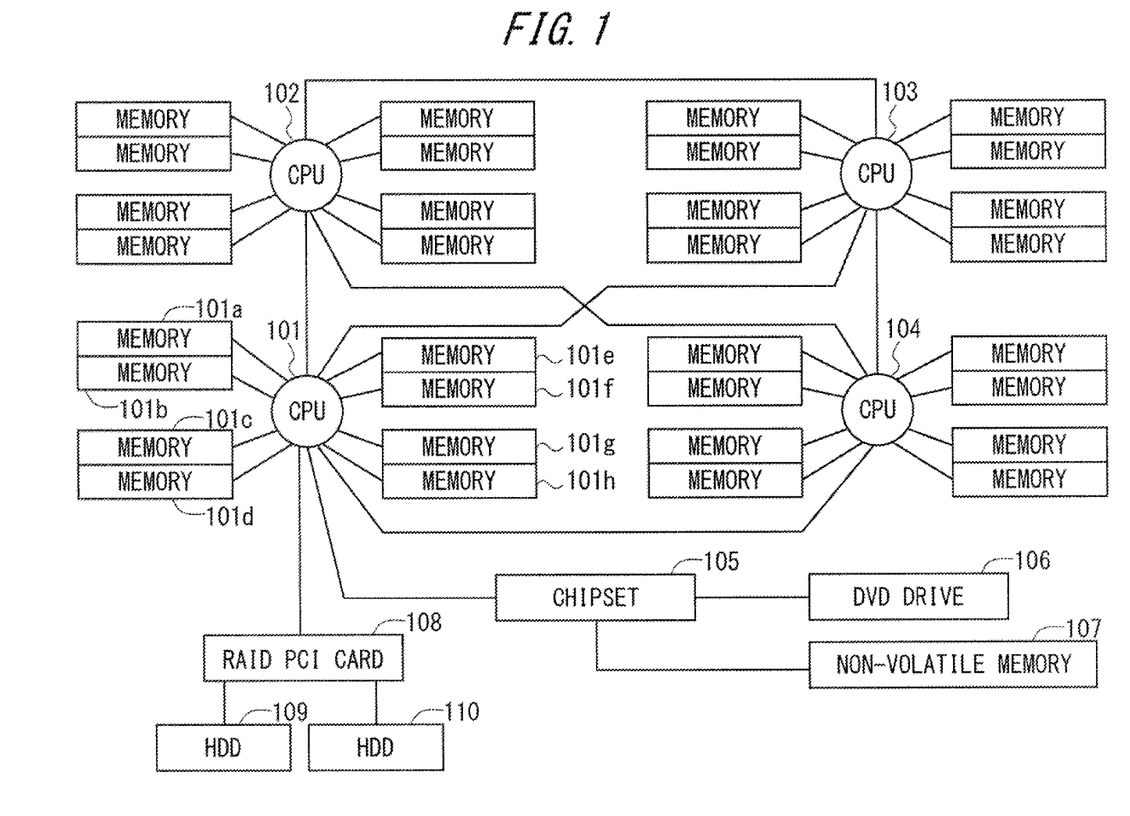
FIG. 1 is a diagram schematically illustrating an example of a configuration of a server according to an embodiment.

FIG. 1 is a diagram illustrating an example of a configuration of a server 1 as an information processing apparatus according to the first embodiment. As illustrated in FIG. 1, the server 1 includes four CPUs 101, 102, 103 and 104, for example. Each CPU 101 to 104 is connected with each other via a QuickPath Interconnect (QPI) interface. CPU 101 is connected with eight pieces of memory 101a, 101b, 101c, 101d, 101e, 101f, 101g and 101h, for example. Each piece of memory 101a to 101h is connected with the CPU 101 via a Double-Data-Rate4 (DDR4) interface (not illustrated). The CPUs 102 to 104 are also connected with memory similar to the CPU 101. In the present embodiment, the CPU 101 takes a leading role of controlling the operations of the CPUs 102 to 104 when programs such as an OS are installed in the server 1. For example, the memory connected with each CPU 101 to 104 is administered in a single physical address space as is the case with Non-UniformMemoryAccess (NUMA) in the server 1. Therefore, the CPU 101 accesses each piece of memory connected with the CPUs 102 to 104 to execute processes for initializing the memory, writing data into the memory and reading data from the memory etc.

In addition, the CPU 101 is connected with a chipset 105 via a QPI interface in the server 1. The chipset 105 is connected with a Digital Versatile Disc (DVD) drive 106 via a Serial AT Attachment (SATA) interface. The chipset is also connected with a non-volatile memory 107 via a Serial Peripheral Interface (SPI) interface. Moreover, the chipset 105 manages the exchange of data between the CPU 101 and the DVD drive 106 and between the CPU 101 and the non-volatile memory 107.

In the present embodiment, a user of the server 1 inserts a medium in which a setup support tool for executing the OS installation is stored into the DVD drive 106. And the CPU 101 uses the setup support tool stored in the inserted medium to execute the OS installation. In addition, the setup support tool is read from the inserted medium and stored in the non-volatile memory 107. Further, BIOS codes executed by the CPU 101 are stored in the non-volatile memory 107. Flags which indicate whether each piece of memory connected with the CPUs 101 to 104 has been initialized are also stored in the non-volatile memory 107.

The CPU 101 is connected with a RAID PCI card 108 via a PCI Express bus interface. In addition, the RAID PCI card 108 is connected with Hard Disk Drive (HDD) 109 and HDD 110 via a Serial Attached SCSI (SAS)/SATA interface. The RAID PCI card 108 controls the exchange of data between the CPU 101 and the HDD 109 and between the CPU 101 and the HDD 110 based on RAID built by the HDDs 109 and 110.

Figure 3:
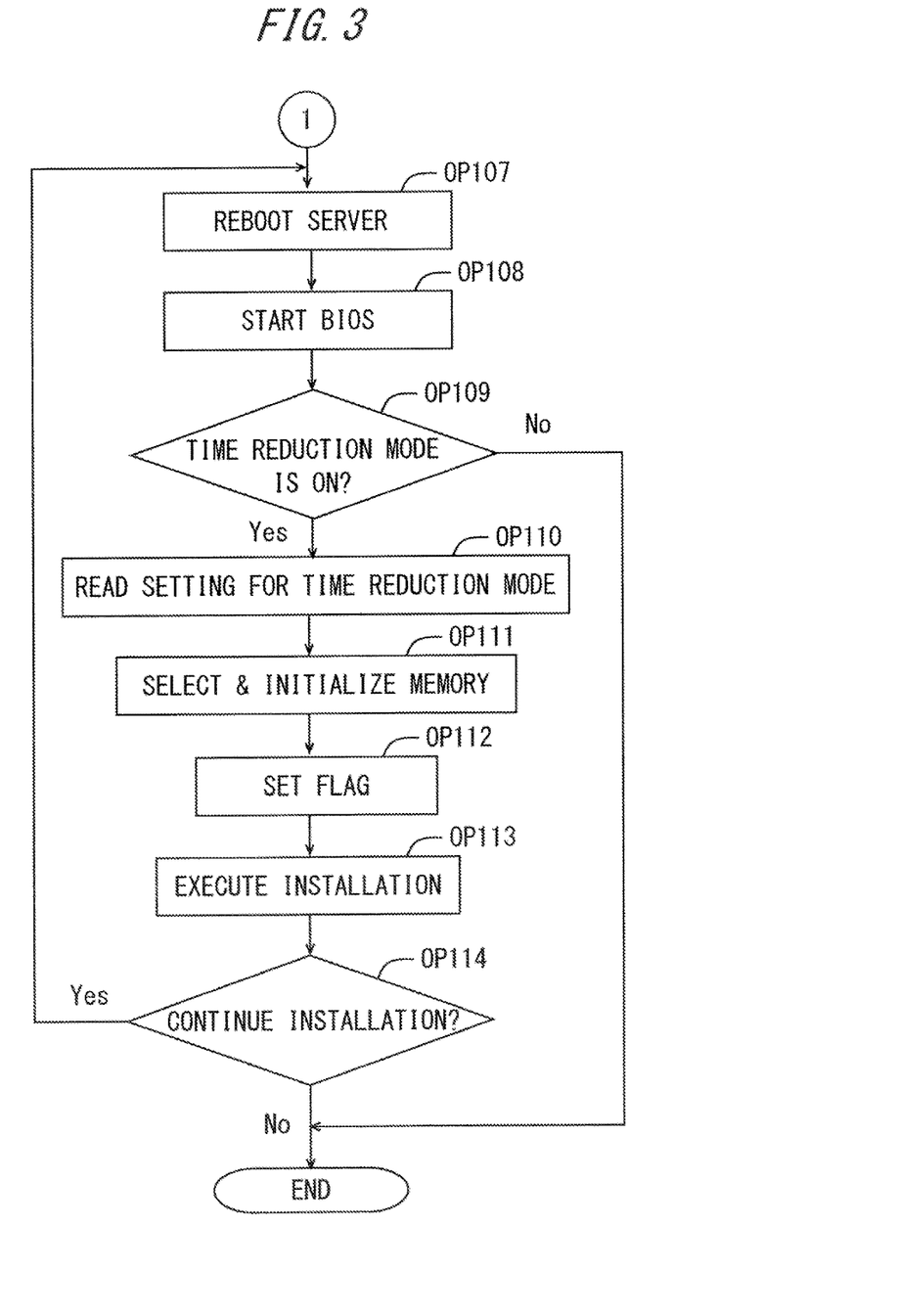
FIG. 3 is a diagram illustrating an example of a flowchart of processes executed after the processes in FIG. 2 by a server according to an embodiment.

FIG. 3 illustrates an example of a flowchart of processes executed by the CPU 101 in the present embodiment. The CPU 101 starts to execute the processes in FIG. 3 when the server 1 is powered on. In OP101, the CPU 101 deploys and executes the BIOS code stored in the non-volatile memory 107. Next, the process proceeds to OP102.

In OP102, the CPU 101 initializes the DDR4 interface for each piece of memory connected with the CPUs 101 to 104 according to processes of the BIOS executed in OP101. As a result, the operation speed, the latency and the access timing etc. of the DDR4 interface for each piece of memory. Next, the process proceeds to OP103.

In 103, the user of the server 1 inserts a medium in which the setup support tool is stored into the DVD drive 106. The CPU 101 reads the setup support tool from the inserted medium and stores the setup support tool in the non-volatile memory 107. The CPU 101 deploys and executes the setup support tool stored in the non-volatile memory 107. The setup support tool in the present embodiment is a tool for executing various processes including processes for executing the OS installation such as a process for selecting the type of the OS installed in the server 1, processes for defining a flag to enable the time reduction mode in the OS installation and processes for defining a flag to administer the initialization status of each piece of memory in the server 1. It is noted that the time reduction mode means a mode as described below in which redundant initialization of each piece of memory is prevented upon the reboot of the server 1 during the OS installation to reduce the time for the processes for initializing each piece of memory upon the reboot. Next, the process proceeds to OP104.

Figure 4:
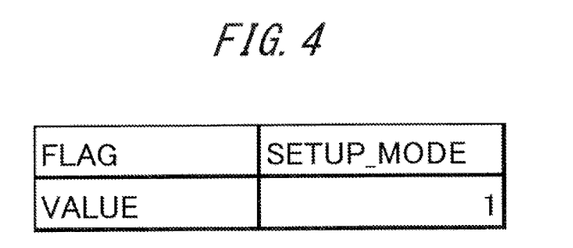
FIG. 4 is a table illustrating an example of a flag for enabling a time reduction mode in an OS installation according to an embodiment.

In OP104, the CPU 101 selects the OS installed in the server 1 according to the processes of the setup support tool executed in OP103. As a result, the settings required for the OS installation are completed. And in OP105, the CPU 101 defines a flag for enabling the time reduction mode of the OS installation in the non-volatile memory 107, and then performs settings of the flag. FIG. 4 illustrates an example of the flag used for enabling the time reduction mode of the OS installation stored in the non-volatile memory 107. It is noted that the non-volatile memory 107 is an example of a storage unit. As illustrated in FIG. 4, the flag MODE_FLAG for enabling the time reduction mode is represented as one bit. The value "0" of the flag represents that the time reduction mode is disabled and the value "1" of the flag represents that the time reduction mode is enabled. After the CPU 101 sets the value of the flag MODE_FLAG to "1", the process proceeds to OP106.

In OP106, the user of the server 1 replaces the medium inserted into the DVD drive 106 with a medium in which an installer for the OS installation is stored. Then the CPU 101 deploys the installer for the OS installation stored in the replaced medium in the DVD drive 106 onto the HDD 109, for example, and executes the deployed installer to start the processes for the OS installation. In OP107, the CPU 101 reboots the server 1. Next, the process proceeds to OP108.

In OP108, the CPU 101 deploys and executes the BIOS codes stored in the non-volatile memory 107 to start the BIOS. In the present embodiment, processes for referencing the flag for enabling the time reduction mode defined in the non-volatile memory 107 are written in the BIOS codes. Therefore, when the BIOS is started, the BIOS references the flag MODE_FLAG for enabling the time reduction mode in the non-volatile memory 107 and determines whether the value of the flag is set to "1" (OP109). When the value of the flag MODE_FLAG is set to "1" (OP109: Yes), the process proceeds to OP110. On the other hand, the value of the flag MODE_FLAG is set to "0" (OP109: No), the CPU 101 terminates the processes of the flowchart.

In OP110, the CPU 101 executes the communication between the BIOS and the setup support tool. The BIOS retrieves the settings for the time reduction mode from the setup support tool. Next, the process proceeds to OP111.

In OP111, the CPU 101 references the flag for managing the initialization status of each piece of memory in the server 1 defined in the non-volatile memory 107. Next, the CPU 101 functions as a selecting unit to select memory used for processes for the OS installation according to the value of the flag. Further, the CPU 101 functions as an initializing unit to initialize the selected memory. It is noted that the flag for managing the initialization status of each piece of memory in the server 1 is an example of the first information.

Storage areas for storing data processed in the server 1 are managed on a memory module basis in the following descriptions. One memory module corresponds to one substrate with which a plurality of memory chips are equipped, for example. The memory module is also referred to as Dual In-line Memory Module (DIMM). The memory module is simply referred to as memory in the following descriptions.

Figure 5:
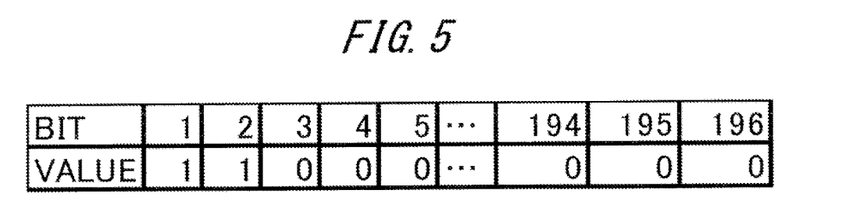
FIG. 5 is a table illustrating an example of a flag for administering initialization status of each piece of memory in a server according to an embodiment.

FIG. 5 illustrates an example of flags for managing the initialization status of each piece of memory in the server 1. It is assumed here that 196 pieces of memory are equipped with the server 1, for example. In this case, a bit sequence in which 196 bits each of which corresponds to each piece of memory are aligned is generated in the non-volatile memory 107. Each bit in the bit sequence represents the initialization status of each piece of memory in the server 1. The value "0" of the bit indicates that the memory corresponding to the bit is not initialized and the value "1" of the bit indicates that the memory corresponding to the bit is initialized.

The CPU 101 references the value of each bit in the bit sequence and selects the memory for which the value of the bit is "0" as a target of initialization. Specifically, the CPU 101 selects the memory used for the OS installation as target (s) of initialization. In the example of the bit sequence in FIG. 5, the values of bit 1 and bit 2 are "1" and the values bit 3 to 5 . . . 194 to 196 are "0". In addition, it is assumed that the number of memory used for the OS installation is two. Therefore, the CPU 101 selects in OP111 two pieces of memory corresponding to bit 3 and bit 4 as targets of initialization.

Next, the CPU 101 initializes in OP112 the memory selected in OP 111. When the initialization of the selected memory is completed, the CPU 101 sets the values of the bits in the bit sequence corresponding to the initialized memory, namely bit 3 and bit 4 in the above example to "1". Since the flag for each piece of memory which indicates whether the initialization of each piece of memory is completed is provided in the present embodiment, a problem that initialized memory is initialized again when the server 1 is rebooted during the OS installation can be prevented. When the CPU 101 completes the processes in OP112, the process proceeds to OP113.

In OP113, the CPU 101 functions as an executing unit to use the memory initialized in OP112 to execute processes for the OS installation. In the present embodiment, the CPU 101 reboots the server 1 during the OS installation. Therefore, the CPU 101 determines in OP114 whether the OS installation is continued. When the CPU 101 continues the OS installation (OP114: Yes), the CPU 101 returns the process to OP107. On the other hand, when the CPU 101 completes the OS installation (OP114: No), the CPU 101 terminates the processes in the flowchart. When the OS installation is completed, the user of the server 1 removes the medium from the DVD drive 106.

Figure 2:
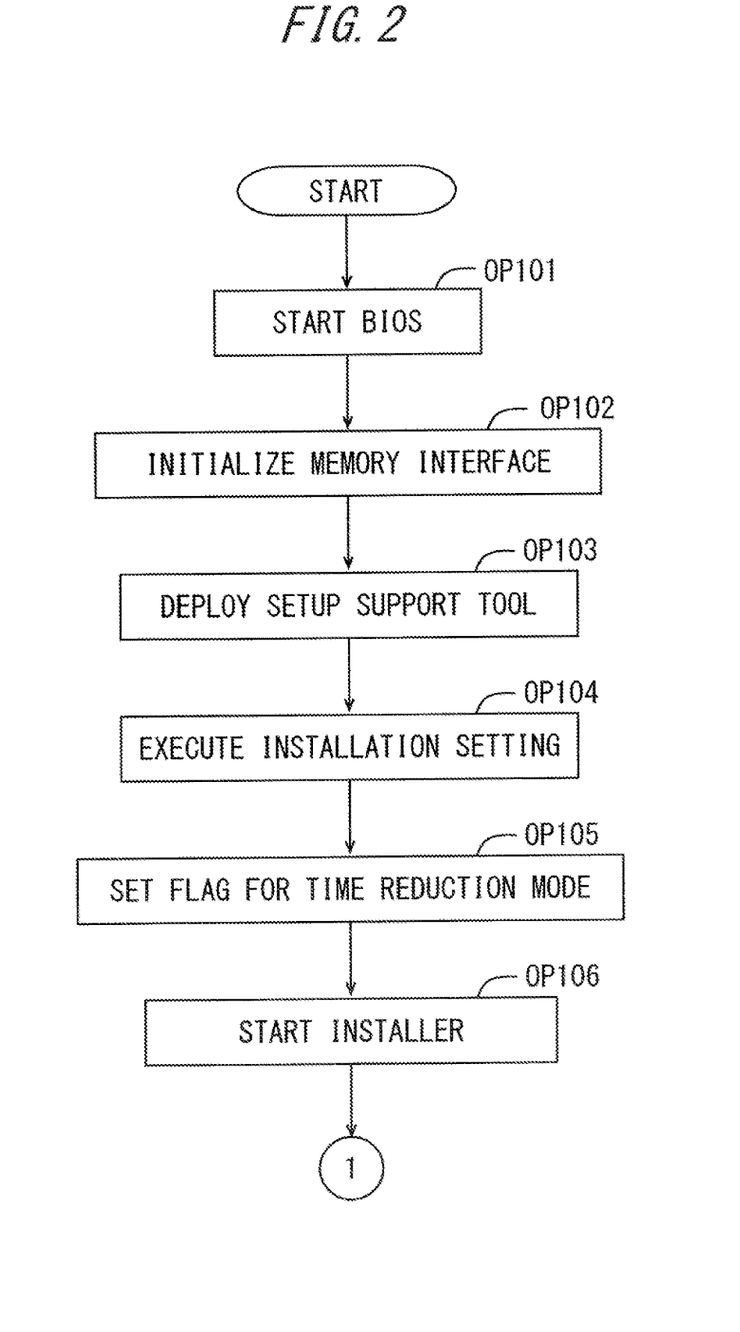
FIG. 2 is a diagram illustrating an example of a flowchart of processes executed by a server according to an embodiment.

Since the CPU 101 executes the processes in the flowchart in FIGS. 2 and 3 as described above, the CPU 101 does not initialize the memory for which the initialization has been completed when the CPU 101 reboots the server 1 during the OS installation. As a result, the processing time for initializing the memory in the server 1 can be shorter than the time for initializing memory in a case in which the initialized memory is initialized again upon the reboot of the server 1.

Figure 6:
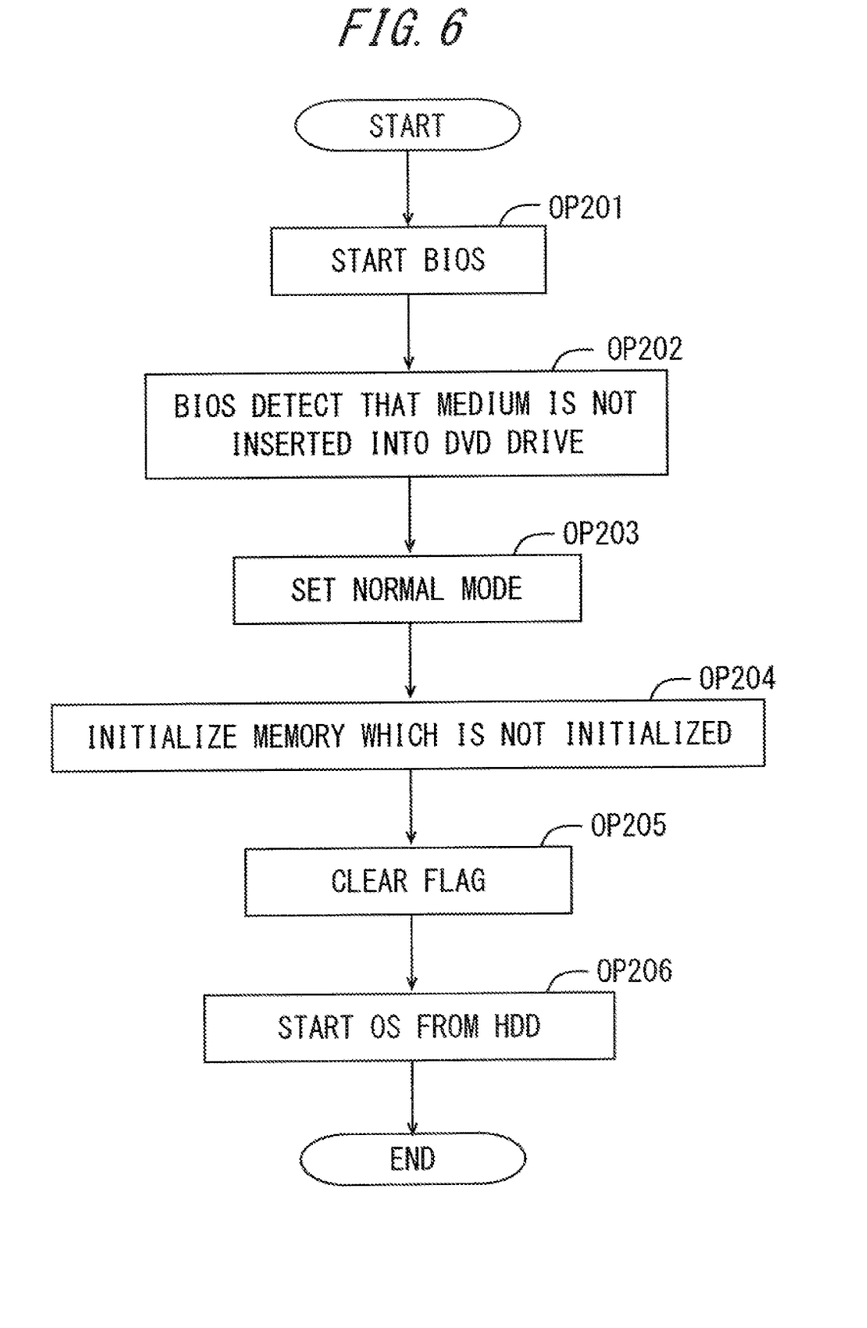
FIG. 6 is a diagram illustrating an example of a flowchart of processes executed after the processes in FIGS. 2 and 3 by a server according to an embodiment.

Next, FIG. 6 illustrates a flowchart of processes executed by the CPU 101 for starting the OS after the CPU 101 completes the processes in FIGS. 3 and 4. The CPU 101 starts the processes in FIG. 6 when the server 1 is started after the CPU 101 completes the processes in FIGS. 3 and 4.

In OP201, the CPU 101 deploys and executes the BIOS codes stored in the non-volatile memory 107. Next, the process proceeds to OP202. In OP202, the CPU 101 detects that a medium for the OS installation is not inserted into the DVD drive 106 according to the processes of the BIOS executed in OP201. Next, the process proceeds to OP 203.

In OP203, the processes of the BIOS set the value of flag MODE_FLAG for enabling the time reduction mode stored in the non-volatile memory 107 to "0". As a result, the CPU 101 executes the processes in OP204 as described below instead of the processes in OP110 and OP111.

In OP204, the CPU 101 references the flag for managing the initialization status of each piece of memory in the server 1 stored in the non-volatile memory 107 to determine the memory which is not initialized. Specifically, the CPU 101 determines the memory for which the value of the bit in the bit sequence is "0". And the CPU 101 initializes the determined memory. Therefore, when the OS is started after the OS installation is completed in the server 1, the memory which is initialized during the OS installation is not initialized and the remaining memory which is not initialized during the OS installation is initialized. As a result, the time for initializing the memory can be shorter than the time for initializing each piece of memory regardless of whether the memory is initialized when the OS is started after the OS installation. Next, the process proceeds to OP205.

In OP205, the CPU 101 clears the flag for managing the initialization status of each piece of memory in the server 1, setting the value of each bit to "0". As a result, when another OS is installed in the server 1, the flag can be reused to prevent the initialized memory from being reinitialized upon the reboot of the server 1. Next, the process proceeds to OP206. In OP206, the CPU 101 executes the processes for stating the OS from the HDD in which the OS is installed such as HDD 109. Since the processes in OP206 for stating the OS executed by the CPU are conventional, the detailed descriptions of the processes are omitted here. When the CPU completes the processes in OP206, the CPU terminates the processes in the flowchart.

Figure 7:
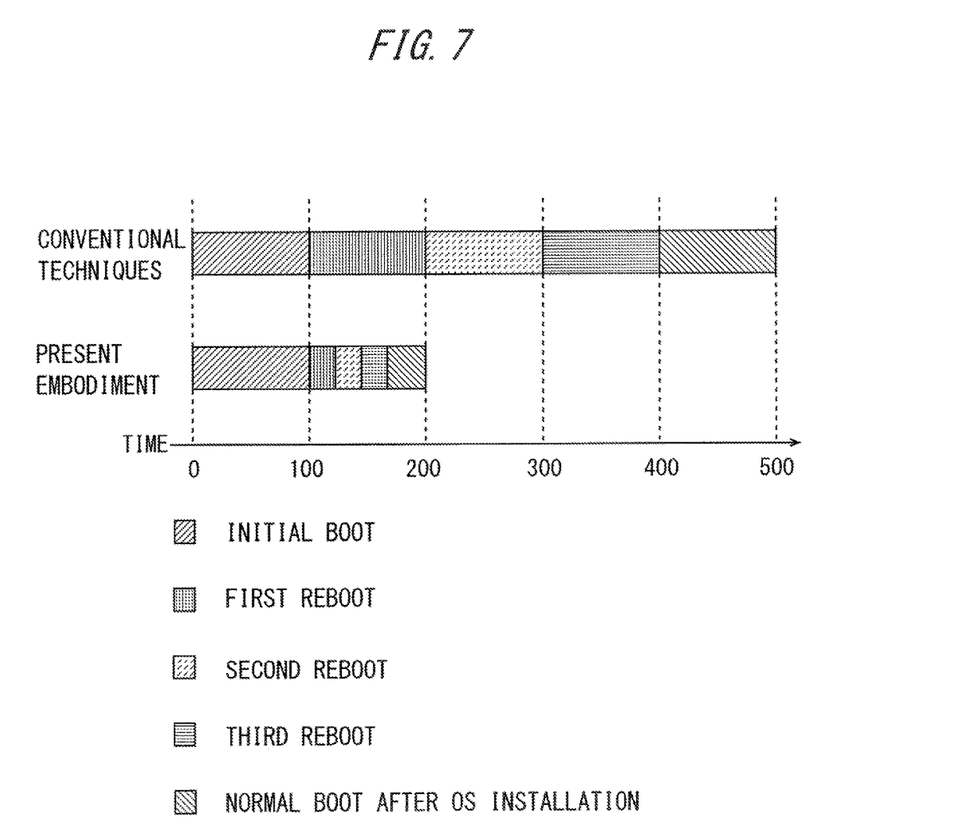
FIG. 7 is a graph illustrating an example of processing time for initializing memory in a server according to an embodiment.

FIG. 7 illustrates an example of a graph indicated by "Present Embodiment" representing processing time for initializing memory when the server 1 is rebooted three times after the initial boot and the OS is started ("Normal Start") after the OS installation. It is noted that the horizontal axis of the graph represents a predetermined unit of time and the predetermined unit of time is a mere example. In addition, FIG. 7 also illustrates a graph indicated by "Conventional Technique" representing processing time for initialization memory when the server 1 is configured according to the conventional techniques, the server 1 is rebooted three times after the initial boot and the OS is started ("Normal Start") after the OS installation.

As illustrated in FIG. 7, when the server 1 is configured according to the conventional techniques, each piece of memory in the server 1 is initialized each time when the server 1 is rebooted. Therefore, the length of processing time for initializing the memory in each time of reboot is almost the same. On the other hand, when the server 1 is configured according to the present embodiment, the processing time for initializing the memory upon the initial boot of the server 1 is almost the same as the time for initializing the memory in the case in which the server 1 is configured according to the conventional techniques. However, the processing time for initializing the memory each time when the server 1 is rebooted after the OS installation is started can be reduced contrary to the case in which the server 1 is configured according to the conventional techniques. This is because although the memory which is used for the OS installation is initialized when the server 1 is rebooted, the initialization of the memory which is not used for the OS installation and the memory which is initialized is omitted each time of the reboot.

Further, when the server 1 is configured to according to the present embodiment, the processing time for initializing the memory upon the normal start after the OS installation is completed can also be reduced. This is because the initialization of the memory which has been initialized upon the initial boot and the reboots during the OS installation is omitted when the server 1 is normally started after the OS installation.

Although specific embodiments are described above, the configurations of the server etc. described and illustrated in each example can be arbitrarily modified and/or combined. A variation of the embodiments as described above is described below. The user of the server 1 inserts media including programs such as the setup support tool and the installer for the OS installation into the DVD drive 106 and the CPU 101 executes the programs stored in the inserted media to proceed with the OS installation in the above embodiment. On the other hand, the programs for the OS installation can be downloaded via a network as described in the present variation.

Figure 8:
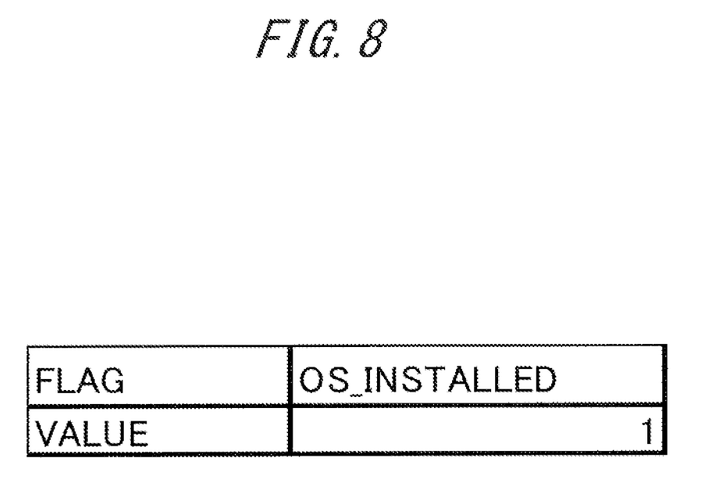
FIG. 8 is a table illustrating an example of a flag indicating whether OS installation is completed according to an embodiment.

In the present variation, a flag indicating whether the OS installation is completed is defined in the non-volatile memory 107. It is noted that the flag indicating whether the OS installation is completed is an example of the second information. FIG. 8 illustrates an example of the flag indicating whether the OS installation is completed. As illustrated in FIG. 8, the flag OS_INSTALLED indicating whether the OS installation is completed is represented as one bit. The value "0" of the flag represents that the OS installation is not completed and the value "1" of the flag represents that the OS installation is completed.

Figure 9:
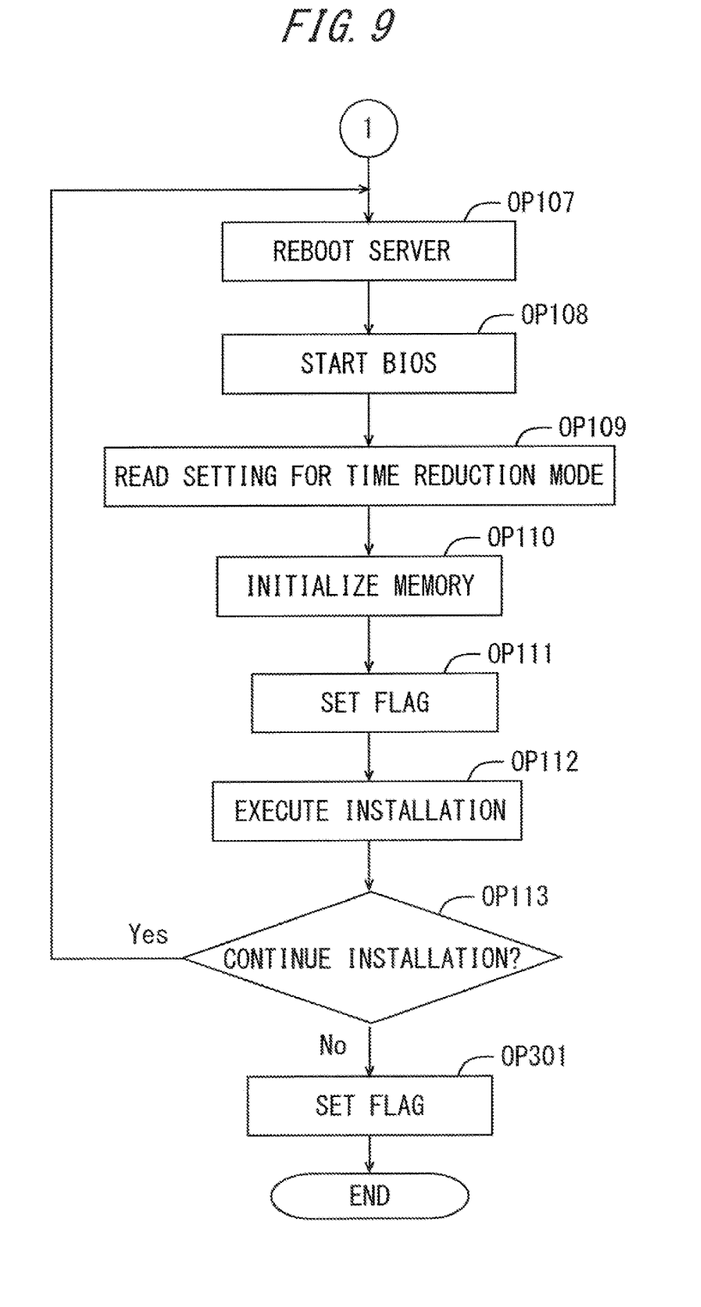
FIG. 9 is a diagram illustrating an example of a flowchart of processes executed by a server according to a variation.
Figure 10:
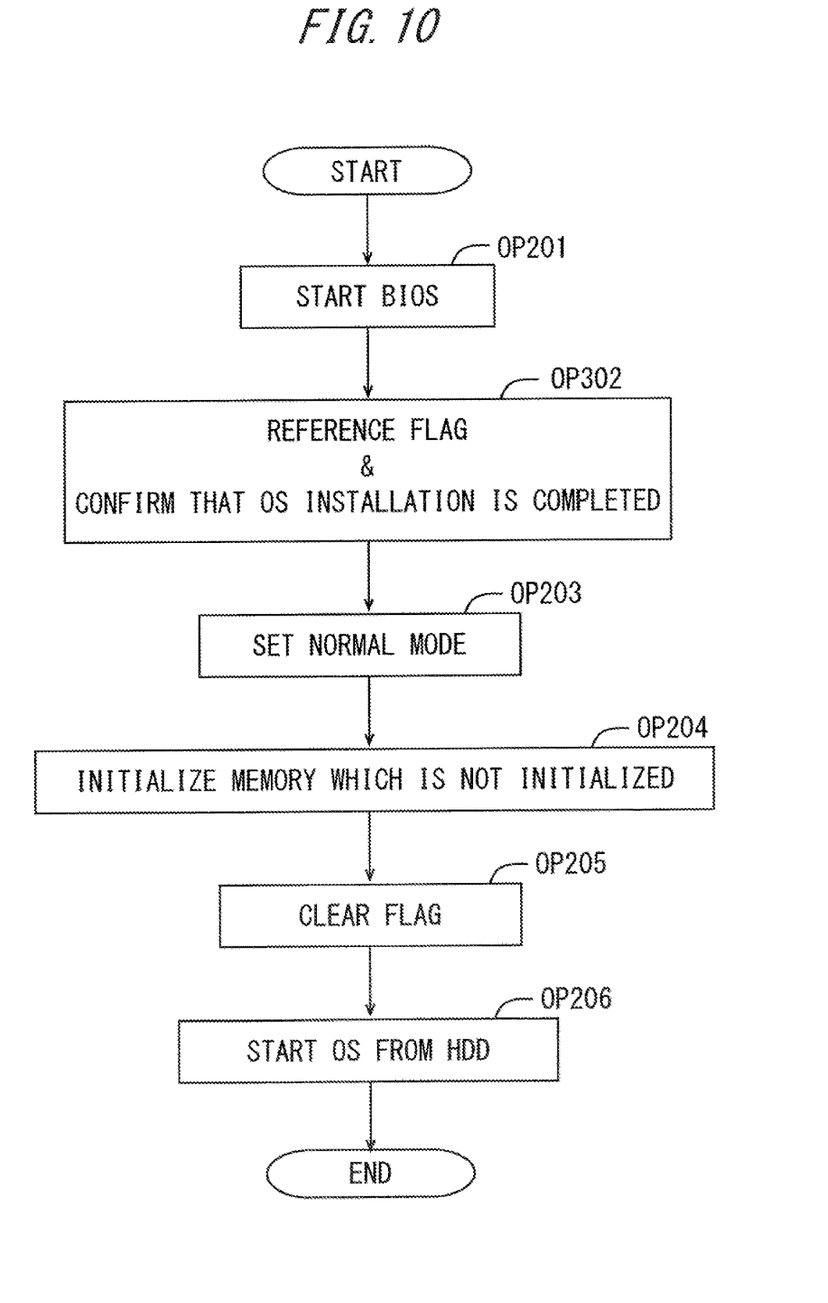
FIG. 10 is a diagram illustrating an example of a flowchart of processes executed after the processes in FIG. 9 by a server according to a variation.

FIGS. 9 and 10 illustrates an example of a flowchart of processes executed by the CPU 11 when the programs for the OS installation in the server 1 are downloaded via the network. It is noted that the elements and the processes corresponding to the elements and the processes in the above embodiment are attached with the same signs of the elements and the processes in the above embodiment and the detailed descriptions are omitted below. In the present variation, when the CPU 101 determines in OP113 that the OS installation is completed (OP113: Yes), the process proceeds to OP301. In OP301, the CPU 101 sets the value of the flag OS_INSTALLED to "1".

Then, the CPU 101 executes the processes in the flowchart in FIG. 10 to start processes for starting the OS installed in the server 1. In this case, after the CPU 101 starts in OP201 the BIOS, the CPU 101 confirms in OP302 that the value for the flag OS_INSTALLED set in OP301 is "1". As a result, the CPU 101 can recognize that the OS is installed in the server 1. And the process proceeds to OP203. After the process in OP203, the CPU 101 initializes in OP204 the memory which is not initialized in the server 1. When the CPU 101 initializes the memory which is not initialized, the CPU 101 clears the flag MODE_FLAG, the flag OS_IN- STALLED and the flag for managing the initialization status of each piece of memory in the server 1, setting the value of each bit to "0". In OP206, the CPU 101 executes the processes for stating the OS from the HDD in which the OS is installed such as HDD 109. When the CPU completes the processes in OP206, the CPU terminates the processes in the flowchart.

In the variation as described above, when the programs for the OS installation is downloaded via the network, the memory which is initialized is not reinitialized and the memory which is not initialized is initialized. As a result, the processing time for initializing the memory in the server 1 can be shorter than the time for initializing memory in a case in which the initialized memory is initialized again upon the start of the server 1 after the OS installation.

In addition, although it is assumed in the examples as described above that the server 1 is repeatedly rebooted during the OS installation, the above configurations of the server 1 can be applied to a case in which the server 1 is repeatedly rebooted during processes other than the OS installation. For example, it can be assumed that the server 1 is rebooted during the processes in which the changes to the system parameters of the server 1 including the changes to the hardware configurations such as the Input/Output (I/O) of the server 1 and the changes to the registry and the configuration files and the OS startup processes are sequentially executed. In such cases, after memory used for executing the processes is initialized, the initialized memory is not reinitialized when the server 1 is rebooted and the remaining memory which is not initialized is initialized.

Figure 11:
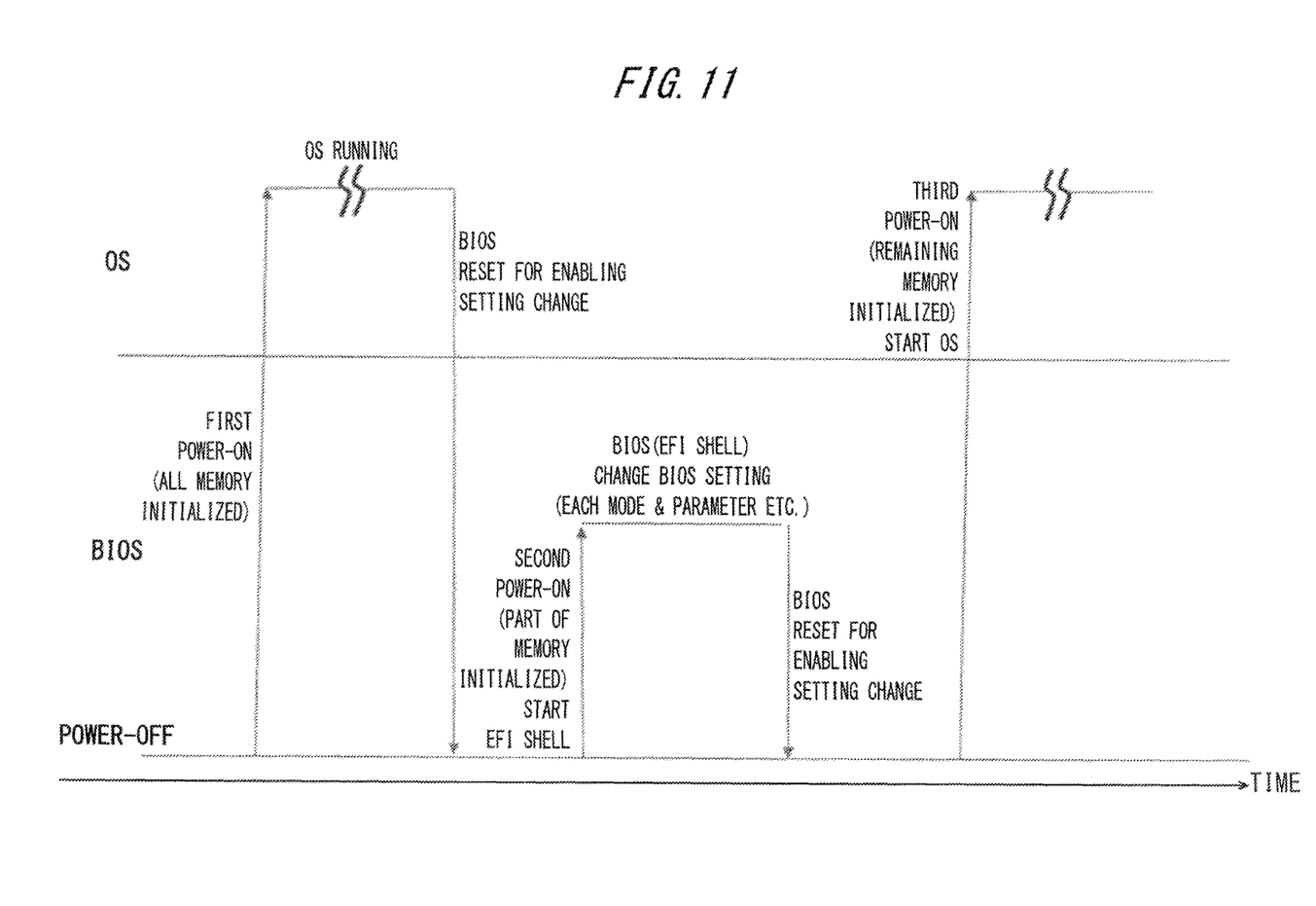
FIG. 11 is a diagram illustrating an example of processes sequentially executed by a server according to an embodiment.

FIG. 11 illustrates an example of processes for executing the changes to the system parameters of the server 1 and the OS startup processes sequentially. Specifically, FIG. 11 illustrates processes for changing the mode settings or the parameter settings of the BIOS during the startup of the OS and then starting the OS. It is noted that the horizontal axis is time axis and processes for powering off the server 1 ("Power-Off" in FIG. 11), processes for executing the BIOS ("BIOS" in FIG. 11) and processes for starting the OS ("OS" in FIG. 11) in the example in FIG. 11.

As illustrated in FIG. 11, the server 1 is powered on and the BIOS is started. This corresponds to the transition from "Power-OFF" to "BIOS" in FIG. 11. In addition, the memory in the server 1 is initialized upon the initial boot of the server 1 during the processes of the BIOS. When the processes of the BIOS are completed, the processes for starting the OS are executed. This corresponds to the transition from "BIOS" to "OS" in FIG. 11. The mode settings or the parameter settings of the BIOS are changed during the processes for starting the OS. As a result, the server 1 is rebooted in order to enable the changes of the settings in the server 1. This corresponds to the transition from "OS" to "Power-Off" in FIG. 11.

When the server is rebooted (the second boot) and the BIOS is started (this corresponds to the transition from "Power-Off" to "BIOS" in FIG. 11), the memory used for the processes for the BIOS is selected and initialized. And the initialized memory is used to start the BIOS and an EFI shell is executed during the BIOS processes. The BIOS settings are changed on the EFI shell according to the changes to the mode settings and the parameter settings of the BIOS which are made during the initial boot. Next, the server 1 is rebooted in order to enable the changes to the BIOS settings. This corresponds to the transition from "BIOS" to "Power-Off" in FIG. 11.

When the server is rebooted (the third boot) and the BIOS is started (this corresponds to the transition from "Power- Off" to "BIOS"), the memory other than the initialized memory used for the execution of the EFI shell is initialized. As a result, when the OS is started in the server 1 (this corresponds to the transition from "BIOS" to "OS"), the initialization of the memory used for the execution of the EFI shell. Therefore, the time for initializing the memory can be reduced due to the omission of the initialization of the memory for the EFI shell.

Thus, when the server 1 is configured as described above, the reinitializing of the memory which is initialized can be prevented when the server 1 is rebooted. It is noted that the processes for sequentially executing the processes for installing the OS and changing the system parameters in the server 1 is an example of processes including the first process, a process for rebooting the information processing apparatus and the second process.

Moreover, the CPU as described above is not limited to a single processor but can be configured as multiple processors. In addition, the CPU can be configured as a multi-core processor and each CPU is connected via a single socket with each other. A part or the whole of the processes can be executed by a Digital Signal Processor (DSP), a Graphics Processing Unit (GPU), a numerical processor, a vector processor, a dedicated processor such as an image processing processor. Furthermore, at least a part of the elements in the above embodiment can be an Integrated Circuit (IC) or a digital circuit. Moreover, an analog circuit can be also used in at least a part of the elements in the above embodiment. The IC includes a Large Scale Integration (LSI), an Application Specific Integrated Circuit (ASIC), and a Programmable Logic Device (PLD). The PLD includes a Field-Programmable Gate Array (FPGA). The above parts can be a combination of a processor and an IC. The combination is referred to as Micro-Controller Unit (MCU), System-on-a-Chip (SoC), system LSI and chipset etc.

<<Computer Readable Recording Medium>>

It is possible to record a program which causes a computer to implement any of the functions including the management tools for setting the above information processing apparatus and the OS etc. described above on a computer readable recording medium. In addition, by causing the computer to read in the program from the recording medium and execute it, the function thereof can be provided.

The computer readable recording medium mentioned herein indicates a recording medium which stores information such as data and a program by an electric, magnetic, optical, mechanical, or chemical operation and allows the stored information to be read from the computer. Of such recording media, those detachable from the computer include, e.g., a flexible disk, a magneto-optical disk, a CD-ROM, a CD-R/W, a DVD, a DAT, an 8-mm tape, and a memory card. Of such recording media, those fixed to the computer include a hard disk and a ROM.

According to one aspect, it is provided an information processing apparatus which reduces the time for executing processes including processes for rebooting the information processing apparatus.

All example and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A non-transitory computer-readable recording medium storing a program that causes an information processing apparatus which includes a plurality of memory areas and executes a first process and a plurality of rebooting processes for rebooting the information processing apparatus during the first process to execute each time one of the plurality of rebooting processes is executed:
referencing an indicator indicating whether time reduction executed by the information processing apparatus is enabled;
initializing, when the indicator indicates that the time reduction is enabled, a first memory area of the plurality of memory areas as a memory area used for executing the first process;
updating, when the indicator indicates that the time reduction is enabled, first information stored in a memory area, the first information indicating whether each memory area of the plurality of memory areas has been initialized;
executing, when the indicator indicates that the time reduction is enabled, the first process by using the memory area initialized as the memory area used for executing the first process,
the initializing references the first information and selects, according to the first information, as the first memory area a memory area which has not been initialized,
the information processing apparatus further executes a second process after the first process is completed, and
the program causes the information processing apparatus to further execute:
selecting according to the first information a second memory area used for executing the second process which has not been initialized;
initializing the second memory area selected by the selecting; and
executing the second process by using the second memory area selected by the selecting and initialized by the initializing.

2. The non-transitory computer-readable recording medium according to claim 1, wherein the program causes the information processing apparatus to further execute:
storing second information in the memory area used for storing the first information, the second information indicating whether the second process is completed; and
initializing according to the first information, when the second information indicates that the second process is completed, a memory area which has not been initialized.

3. An information processing apparatus which includes a plurality of memory areas and executes a first process and a plurality of rebooting processes for rebooting the information processing apparatus during the first process, the information processing apparatus comprising:
a processor; and
memory storing an instruction for causing the processor to execute each time one of the plurality of rebooting processes is executed:
referencing an indicator indicating whether time reduction executed by the information processing apparatus is enabled;

initializing, when the indicator indicates that the time reduction is enabled, a first memory area of the plurality of memory areas as a memory area used for executing the first process;

updating, when the indicator indicates that the time reduction is enabled, first information stored in a memory area, the first information indicating whether each memory area of the plurality of memory areas has been initialized;

executing, when the indicator indicates that the time reduction is enabled, the first process by using the memory area initialized as the memory area used for executing the first process, the initializing references the first information and selects, according to the first information, as the first memory area a memory area which has not been initialized, the information processing apparatus further executes a second process after the first process is completed, and the processor further executes:

selecting according to the first information a second memory area used for executing the second process which has not been initialized;

initializing the second memory area selected by the selecting; and executing the second process by using the second memory area selected by the selecting and initialized by the initializing.

4. The information processing apparatus according to claim 3, wherein the processor further executes:

storing second information in the memory area used for storing the first information, the second information indicating whether the second process is completed; and initializing according to the first information, when the second information indicates that the second process is completed, a memory area which has not been initialized.

5. A method of controlling an information processing apparatus which includes a plurality of memory areas and executes a first process and a plurality of rebooting processes for rebooting the information processing apparatus, the method comprising:

controlling the information processing apparatus to execute each time one of the plurality of rebooting processes is executed:

referencing an indicator indicating whether time reduction executed by the information processing apparatus is enabled;

initializing, when the indicator indicates that the time reduction is enabled, a first memory area of the plurality of memory areas as a memory area used for executing the first process;

updating, when the indicator indicates that the time reduction is enabled, first information stored in a memory area, the first information indicating whether each memory area of the plurality of memory areas has been initialized;

executing, when the indicator indicates that the time reduction is enabled, the first process by using the memory area initialized as the memory area used for executing the first process, the initializing references the first information and selects, according to the first information, as the first memory area a memory area which has not been initialized, the information processing apparatus further executes a second process after the first process is completed, and the method further comprises:

selecting according to the first information a second memory area used for executing the second process which has not been initialized;

initializing the second memory area selected by the selecting; and executing the second process by using the second memory area selected by the selecting and initialized by the initializing.

6. The method of controlling the information processing apparatus according to claim 5, the method further comprising:

storing second information in the memory area used for storing the first information, the second information indicating whether the second process is completed; and initializing according to the first information, when the second information indicates that the second process is completed, a memory area which has not been initialized.

* * * * *